(12) United States Patent
Bickel et al.

(10) Patent No.: US 9,218,728 B2
(45) Date of Patent: Dec. 22, 2015

(54) METHODS AND APPARATUS FOR ACOUSTIC EVENT DETECTION

(75) Inventors: Brady R. Bickel, Altoona, PA (US); Robert J. Cole, Pennsylvania Furnace, PA (US); Megan J. Roberts, Boalsburg, PA (US); Bryan D. Glick, State College, PA (US); Jason A. Staph, Altoona, PA (US); David C. James, Port Matilda, PA (US); Gabriel D. Comi, State College, PA (US); Stephen Schadler, State College, PA (US)

(73) Assignee: Raytheon Company, Waltham, MA (US)

(*) Notice: Subject to any disclaimer, the term of this patent is extended or adjusted under 35 U.S.C. 154(b) by 706 days.

(21) Appl. No.: 13/364,862

(22) Filed: Feb. 2, 2012

(65) Prior Publication Data

US 2013/0202120 A1 Aug. 8, 2013

(51) Int. Cl.
*H04R 29/00* (2006.01)
*G01S 5/22* (2006.01)
*G08B 13/16* (2006.01)
(Continued)

(52) U.S. Cl.
CPC ............ *G08B 13/1672* (2013.01); *G01S 5/20* (2013.01); *G01S 5/22* (2013.01); *G10H 2210/00* (2013.01); *G10H 2210/041* (2013.01); *H04R 3/00* (2013.01); *H04R 2410/00* (2013.01); *H04R 2499/11* (2013.01)

(58) Field of Classification Search
CPC ......... G10L 15/02; G10L 15/20; G10L 25/24; G10L 25/87; G01S 3/808; G01S 3/8086; G01S 5/22; G01S 7/003; G01S 3/801; G01S 5/20; G01S 7/52001; G08B 13/1427; G08B 13/1672; G08B 21/0275; G08B 21/043; G08B 21/088; G08B 21/12; G01V 1/001; H04R 29/00; H04R 3/00; H04R 2410/00; H04R 2999/11; G10H 2210/00; G10H 2210/041
USPC ............... 381/56, 58; 340/605, 500; 704/275, 704/256.1, 254, 246, 241, 236, 235, 233, 704/205; 367/124; 345/169; 84/608, 668, 84/616, 609, 612
See application file for complete search history.

(56) References Cited

U.S. PATENT DOCUMENTS 5,703,321 A * 12/1997 Feierlein et al. ............... 102/427
5,703,835 A * 12/1997 Sharkey et al. ............... 367/124
(Continued)

FOREIGN PATENT DOCUMENTS

JP 2011151634 * 1/2010 ............... H04R 3/00
JP 2011151634 A * 8/2011

OTHER PUBLICATIONS

Dr. Amita Dev and Poonam Bansal, "Robust Features for Noisy Speech Recognition using MFCC Computation from Magnitude Spectrum of Higher Order Autocorrelation Coefficients", International Journal of Computer Applications (0975-8887), vol. 10, No. 8, Nov. 2010, pp. 36-38.

*Primary Examiner* — Vivian Chin
*Assistant Examiner* — Ubachukwu Odunukwe
(74) *Attorney, Agent, or Firm* — Daly, Crowley, Mofford & Durkee, LLP

(57) ABSTRACT

Methods and apparatus to identify a type of acoustic event Mel Frequency Cepstral Coefficients (MFCCs). In one embodiment, received sound is processed using the MFCCs to locate a peak for comparison with a stored event to determine if the peak corresponds to the acoustic event.

14 Claims, 9 Drawing Sheets

(51) Int. Cl.
  *G01S 5/20* (2006.01)
  *H04R 3/00* (2006.01)

(56) References Cited

U.S. PATENT DOCUMENTS

| | | | |
|---|---|---|---|
| 6,633,842 B1 * | 10/2003 | Gong | 704/233 |
| 7,266,045 B2 | 9/2007 | Baxter et al. | |
| 7,411,865 B2 | 8/2008 | Calhoun | |
| 7,474,589 B2 | 1/2009 | Showen et al. | |
| 7,532,542 B2 | 5/2009 | Baxter et al. | |
| 7,586,812 B2 | 9/2009 | Baxter et al. | |
| 7,599,252 B2 | 10/2009 | Showen et al. | |
| 7,602,329 B2 | 10/2009 | Manderville et al. | |
| 7,688,679 B2 | 3/2010 | Baxter et al. | |
| 7,710,278 B2 | 5/2010 | Holmes et al. | |
| 7,719,428 B2 | 5/2010 | Fisher et al. | |
| 7,750,814 B2 | 7/2010 | Fisher et al. | |
| 7,751,282 B2 | 7/2010 | Holmes et al. | |
| 7,755,495 B2 | 7/2010 | Baxter et al. | |
| 7,796,470 B1 | 9/2010 | Lauder et al. | |
| 7,855,935 B1 | 12/2010 | Lauder et al. | |
| 7,872,574 B2 * | 1/2011 | Betts et al. | 340/539.26 |
| 7,961,550 B2 | 6/2011 | Calhoun | |
| 8,036,065 B2 | 10/2011 | Baxter et al. | |
| 8,063,773 B2 | 11/2011 | Fisher et al. | |
| 8,390,445 B2 * | 3/2013 | Betts et al. | 340/539.26 |
| 2008/0219100 A1 | 9/2008 | Fisher et al. | |
| 2009/0085873 A1 * | 4/2009 | Betts et al. | 345/169 |
| 2009/0122650 A1 * | 5/2009 | Calhoun | 367/127 |
| 2010/0278013 A1 | 11/2010 | Holmes et al. | |
| 2012/0106746 A1 * | 5/2012 | Bonada et al. | 381/56 |
| 2012/0106758 A1 * | 5/2012 | Bonada et al. | 381/94.3 |
| 2012/0224706 A1 * | 9/2012 | Hwang et al. | 381/56 |

\* cited by examiner

METHODS AND APPARATUS FOR ACOUSTIC EVENT DETECTION

BACKGROUND

There are a variety of known systems to detect acoustic events. One such system detects an acoustic event using multiple sensors located at significant distances from each other, which must detect the same event. Other systems utilize Gaussian Mixture Models that require the detection of a population of events. In addition, many known systems for detecting gunshots, for example, require a priori information. Further, such systems can be complex and can require significant equipment, such as microphones, antenna arrays, personnel at a central station, etc.

SUMMARY

The present invention provides methods and apparatus to detect an acoustic event by processing sound information to detect certain characteristics. In one embodiment, Mel Frequency Cepstral Coefficients (MFCCs) are used to compress the audio information into components on a log-frequency scale for comparison with an expected acoustic decay envelope for a type of event, such as a gunshot. With this arrangement, a particular type of acoustic event can be reliably detected. While exemplary embodiments of the invention are shown and described in conjunction with certain configurations, acoustic events, frequencies, signal processing techniques, and the like, it is understood that embodiments of the invention are applicable to acoustic event detection in general in which single event detection is desirable.

In one aspect of the invention, a method to identify a type of acoustic event comprises: receiving sound, using the received sound to generate Mel Frequency Cepstral Coefficients (MFCCs), processing, using a computer processor, the received sound using the MFCCs locate a peak, comparing the peak to a stored event to determine if the peak corresponds to the acoustic event, and generating an indication that the acoustic event has been detected.

The method can further include one or more of the following features: using only first order MFCCs, the acoustic event comprises a gunshot, controlling a microphone based on the amplitude of an expected type of acoustic event, computing a goodness of fit for the peak, performing geolocation processing for the acoustic event, wherein comparing the peak to a stored event is performed by a mobile device, which received the sound, and/or establishing an ad hoc network with other mobile devices to correlate and geolocate the acoustic event.

In another aspect of the invention, an article comprises: a computer readable medium having stored non-transitory instructions that enable a machine to identify a type of acoustic event by: using received sound to generate Mel Frequency Cepstral Coefficients (MFCCs), processing the received sound using the MFCCs locate a peak, comparing the peak to a stored event to determine if the peak corresponds to the acoustic event, and generating an indication that the acoustic event has been detected.

The article can further include instructions for one or more of the following features: using only first order MFCCs, the acoustic event comprises a gunshot, controlling a microphone based on the amplitude of an expected type of acoustic event, computing a goodness of fit for the peak, performing geolocation processing for the acoustic event, wherein the comparing the peak to a stored event is performed by a mobile device, which received the sound, and/or establishing an ad hoc network with other mobile devices to correlate and geolocate the acoustic event.

In another aspect of the invention, a system comprises: a means for generating Mel Frequency Cepstral Coefficients (MFCCs) from received sound, a processing means including a computer processor to process the received sound using the MFCCs locate a peak, a comparison means to compare the peak to a stored event to determine if the peak corresponds to the acoustic event, and generator means to generate an indication that the acoustic event has been detected. The system can further include only first order MFCCs are used to process the received sound.

BRIEF DESCRIPTION OF THE DRAWINGS

The foregoing features of this invention, as well as the invention itself, may be more fully understood from the following description of the drawings in which.

DETAILED DESCRIPTION

Figure 1:
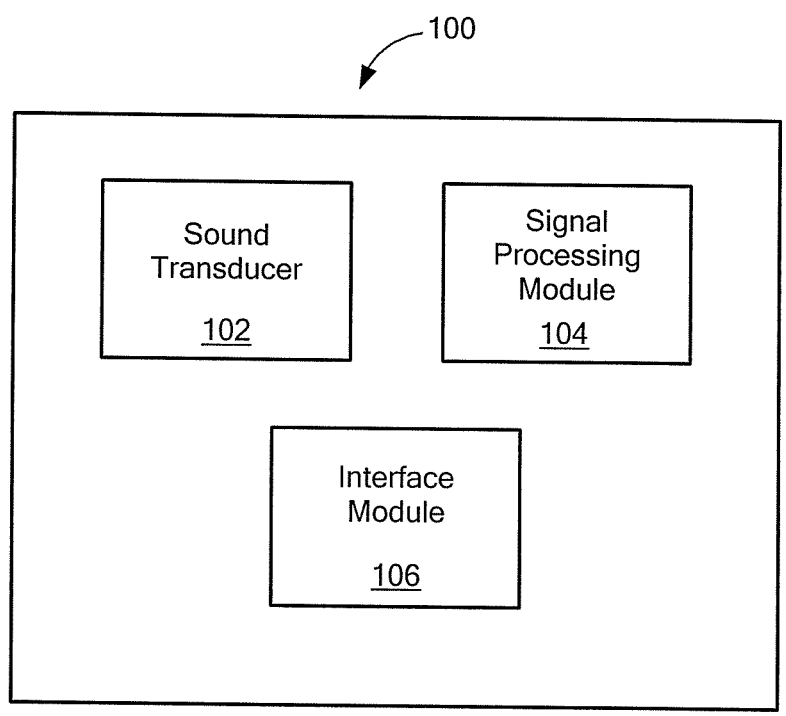
FIG. 1 is a high level block diagram of a system to detect an acoustic event using Mel Frequency Cepstral Coefficients (MFCCs) in accordance with exemplary embodiments of the invention.

FIG. 1 shows an exemplary system 100 for detecting acoustic events in accordance with exemplary embodiments of the invention. The system 100 includes a sound transducer 102, such as a microphone, for receiving acoustic event information and a signal processing module 104 coupled to the sound transducer to process the acoustic information. An interface module 106 is coupled to the signal processor module 104 to transmit an alert and/or other information for the acoustic event, as described more fully below.

While exemplary embodiments of the invention are shown and described in conjunction with detecting an acoustic event in the form of a gunshot, it is understood that embodiments of the invention are applicable to any recognizable acoustic event without departing from the invention. In addition, while exemplary embodiments of the invention utilize Mel Frequency Cepstral Coefficients (MFCC) to detect certain acoustic events, it is understood that other sound processing techniques can also be used.

In one embodiment, Mel Frequency Cepstral Coefficients are used to analyze the audio information for an acoustic event. The Mel-frequency cepstrum (MFC) is a representation of the short-term power spectrum of a sound, based on a linear cosine transform of a log power spectrum on a nonlinear mel scale of frequency. Mel-frequency cepstral coefficients (MFCCs) are coefficients that collectively make up an MFC. The coefficients are derived from a cepstral representation of the audio clip. The difference between the cepstrum and the mel-frequency cepstrum is that in the MFC, the frequency bands are equally spaced on the mel scale, which approximates the human auditory system response more closely than the linearly-spaced frequency bands used in the normal cepstrum.

A MFCC transform represents the data in a similar way to how the human ear interprets audio signals. A filter bank is constructed with the filters uniformly spaced on the mel (logarithmic) scale. The MFCCs are the amplitudes of the discrete cosine transforms of the logarithm of the powers from the mel-scale filters.

In general, a gunshot does not have an obviously unique signature. Most of the acoustic information for a gunshot is found in the first order MFCC. This coefficient contains the volume, or "DC component" of the audio event. In an exemplary embodiment, since there is no significant frequency component, an $L^n$ norm is performed on the fit against a known amplitude decay of a gunshot. In one embodiment, $L^1$ norm is performed against an exponential decay. In an alternative embodiment, a $L^2$ norm is performed. It is understood that the $L^1$ norm amounts to the sum of absolute differences between the template and actual decay. The $L^2$ norm is computed by summing the square of the difference between the template and actual decay.

In one particular embodiment, two seconds of acoustic data is processed at a time using first order coefficients. In other embodiments, other coefficients can be used for additional qualification.

Figure 2:
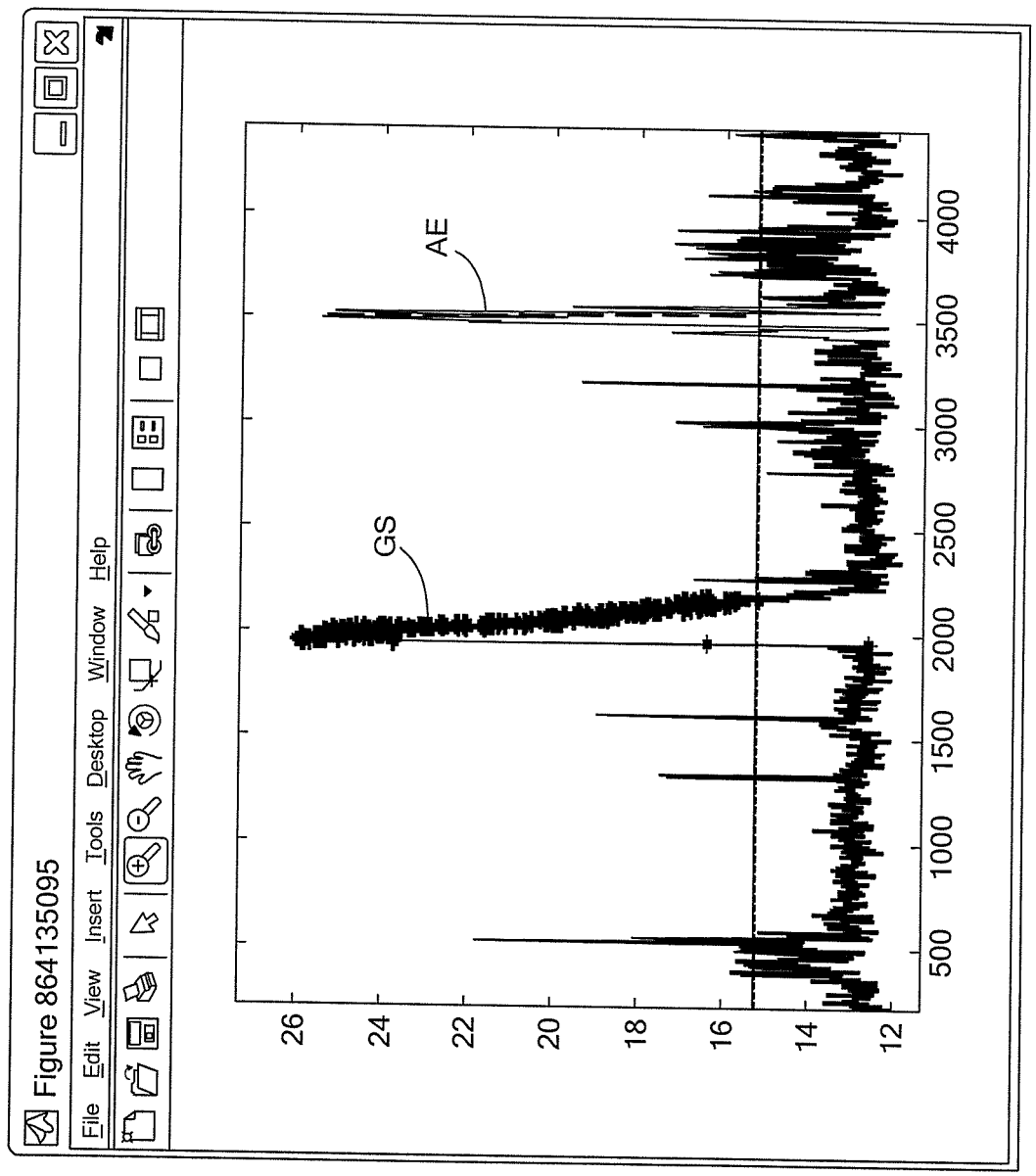
FIG. 2 is a graphical representation of a gunshot acoustic event.

FIG. 2 shows an exemplary detection of a gunshot GS. As can be seen, a gunshot GS has certain characteristics that can be used for detection. In general, a gunshot GS generates a relatively high amplitude acoustic event of relatively short duration. The gunshot GS has amplitude decay that can form the basis to differentiate gunshots from other acoustic events. For example, an acoustic event AE to the right of the gunshot GS has a peak that has exceeded the amplitude threshold, but failed the required peak shape requirements.

Figure 2A:
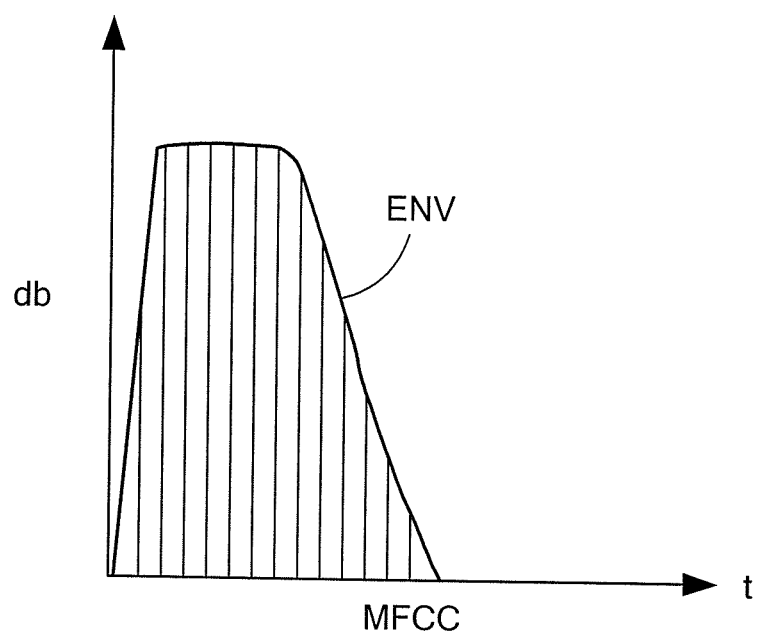
FIG. 2A shows an exemplary envelope defined by MFCCs.

FIG. 2A shows an exemplary representation of an envelope ENV for an acoustic event defined by MFCCs. As described more fully below, a peak from an incoming acoustic event can be compared against a stored envelope or template for a given type of event. If the incoming event is a 'fit' with the template, then the incoming event can be identified as an event corresponding to the template. For example, if the template is for a gunshot and the peak from the incoming event 'fits' the template, than a gunshot event has been detected. It is understood that the illustrated envelope ENV generally corresponds to a gunshot, but is expanded in time for clarity.

In general, certain sudden and loud voice or background events, such as the dropping of the phone, or a voice exclamation, can potentially generate false gunshot detections. In one embodiment, the peak thresholds can be modified to adjust the false detection rate. In some environments, a higher level of false detections may be tolerated to ensure that any actual gunshot is detected. In other embodiments, false detections should be minimized so that only actual gunshots are detected.

In general, exemplary embodiments of the invention are directed to detecting acoustic events, such as a gunshot, having a peak(s) of some amplitude, duration, shape, etc., using at least first order MFCCs. In one embodiment, a single template is used for gunshots. In alternative embodiment, different templates can be selected based upon one or more factors. For example, in a high crime urban area, a template corresponding to commonly used handguns may be used.

In addition, lower volume gunshots, such as those at a significant distance from the microphone present challenges in reliable detection. Lower volume gunshots tend to blend into background noise and false detection rates may be unacceptably high.

It is understood that any practical acoustic transducer can be used. A conventional microphone, such as a cell phone microphone can be suitable for certain applications. In general, the microphone should capture gunshot acoustic events without clipping/saturation.

Figure 3:
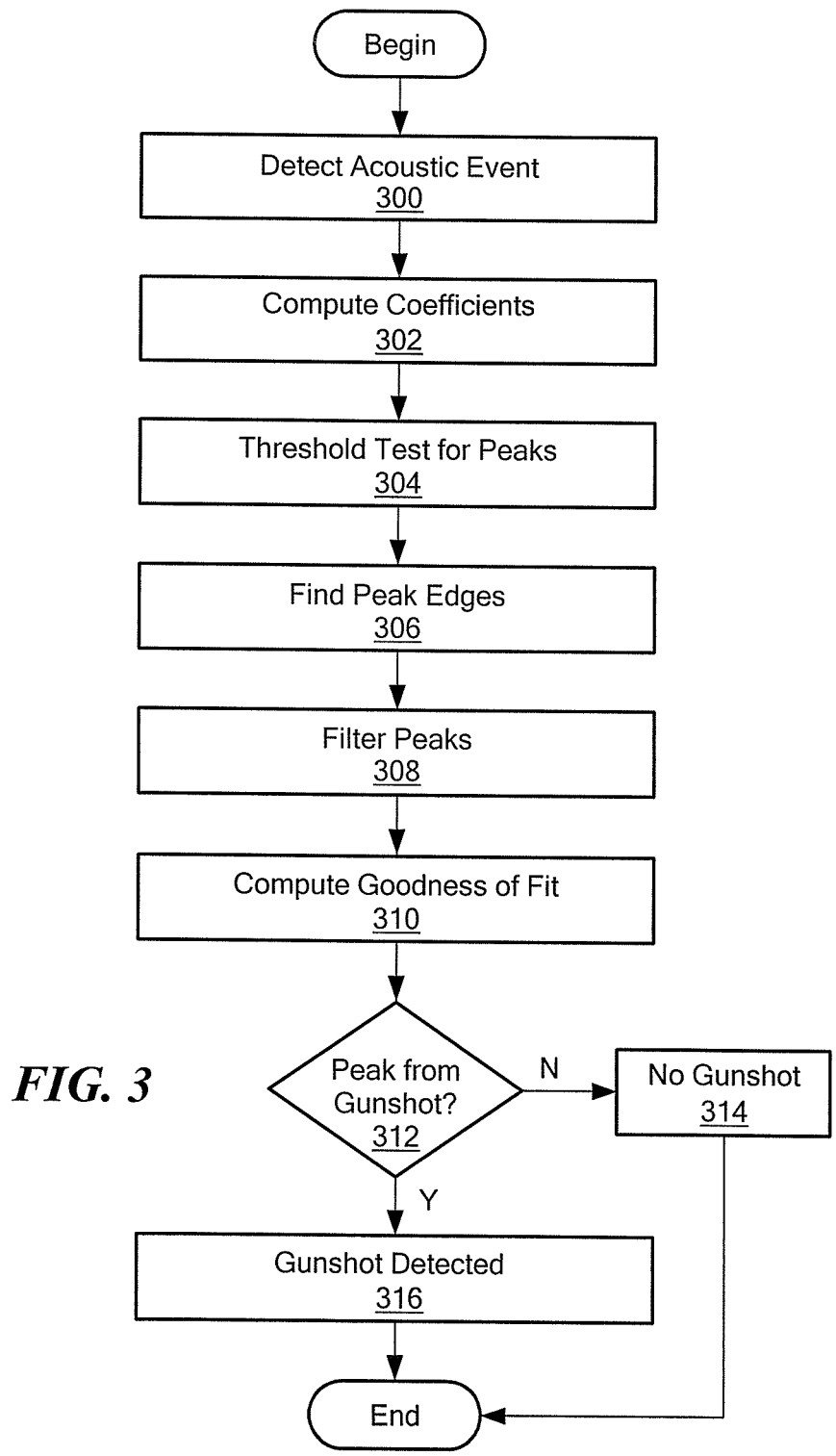
FIG. 3 is a flow diagram showing an exemplary sequence of steps for detecting an acoustic event using MFCCs in accordance with exemplary embodiments of the invention.

FIG. 3 shows an exemplary sequence of steps for implementing gunshot detection with MFCCs in accordance with exemplary embodiments of the invention. In step 300, an acoustic event is detected by a microphone, for example. In step 302, the coefficients are computed from the acoustic event information. In one embodiment, sound clip(s) from the acoustic event is used to generate the coefficients.

In step 304, a threshold test for peaks is performed. In step 306, the system locates peak edges. It is understood that peak edges are the calculated times where the gunshot begins with a sharp explosion and ends with at or near ambient noise level. In step 308, the located peaks are filtered, such as by low pass filtering to smooth the amplitude envelope. The filter removes high frequency components of the gunshot envelope. This smoothed version is then used for peak qualification, which focuses on the shape of the peak. In step 310, a goodness of fit is computed for the peak to a template exponential decay of a gunshot, for example.

In general, the template is selected by using an exponential decay parameter, which can be variable, but is nominally derived from the amplitude fading characteristics of a loud explosion. The fit can be assessed using any practical technique. In one embodiment, a peak duration, kurtosis, $L^1$ norm must be within certain ranges, and the beginning amplitude transition must be sufficiently sharp (from the explosive sound). False detection is a significant consideration, but different parameters and goodness of fit criteria may be selected for specific target tuning.

In step 312, it is determined whether the computed goodness of fit has detected a gunshot. If not, there is a no gunshot detection in step 314. If so, there is gunshot detection in step 316. Processing then continues in step 300 to analyze further acoustic events.

Figure 3A:
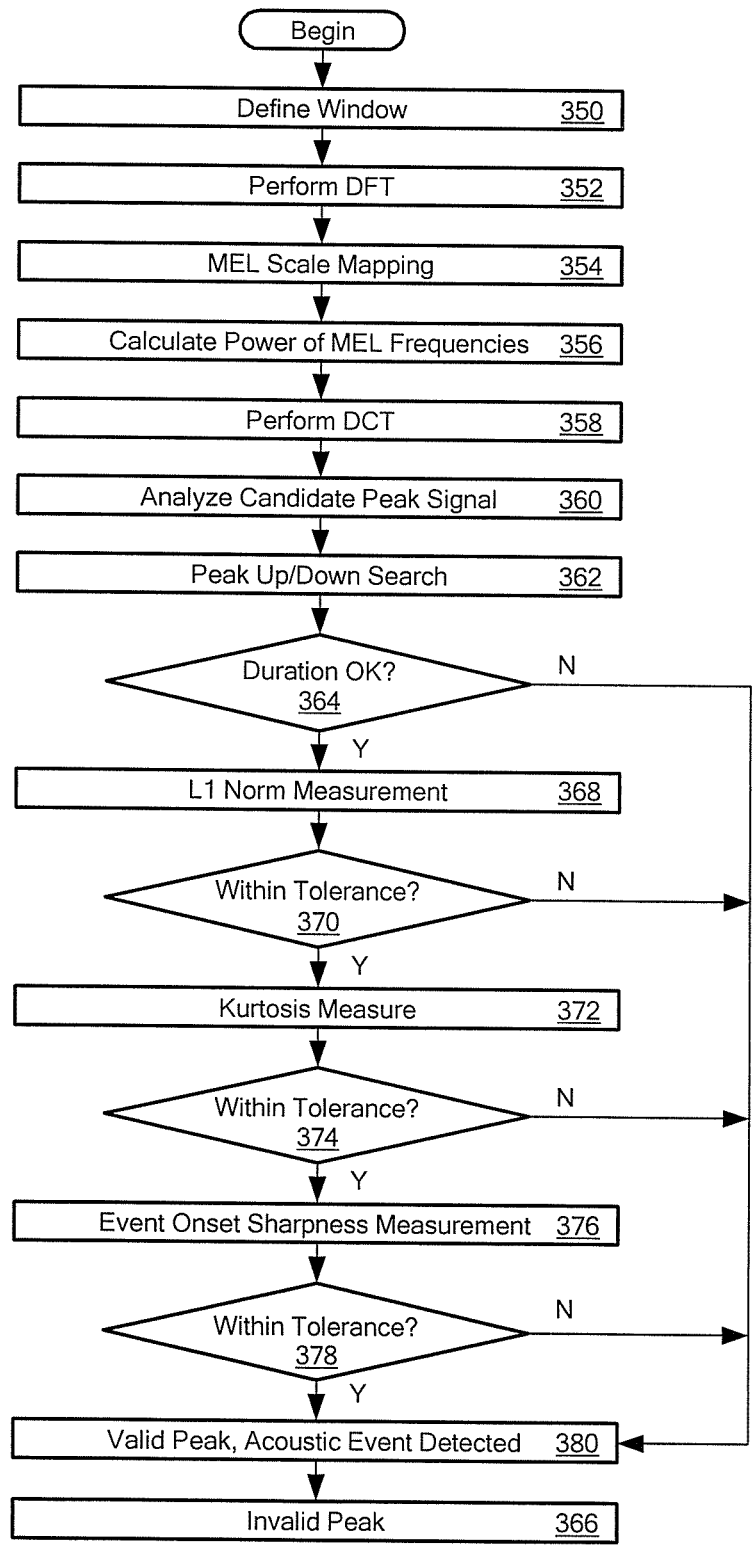
FIG. 3A is a further flow diagram showing an exemplary sequence of steps for detecting an acoustic event using MFCCs in accordance with exemplary embodiments of the invention.

FIG. 3A shows an exemplary sequence of steps for generating MFCCs and detecting an acoustic event. In step 350, a window is defined for an incoming audio signal. In step 352, a DFT (Discrete Fourier Transform) is performed prior to performing Mel scale mapping in step 354. For example, mel m, frequency f, may be computed as $m=2595 \log_{10}(1+f/700)$. In step 356, the power of the Mel frequencies are calculated for input to a discrete cosine transform (DCT) in step 358 to generate the MFCCs. The MFCCs are used to analyze a candidate peak from the processed audio signal in step 360. A peak up/down search is performed in step 362 for a determination in step 364 whether a duration of the peak fits a template peak duration. If not, the peak is determined to be invalid in step 366. It is understood that an 'invalid peak' means that the acoustic event is not of the type for which detection is desired.

If the peak duration is acceptable, in step 368 an $L^1$ norm measurement is performed to determine in step 370 whether the peak is within a selected tolerance. If not, in step 366 the peak is considered invalid. If so, in step 372 a Kurtosis measure is performed. As is well known in the art, kurtosis refers to a measure of the 'peakedness' of the probability distribution of a real-valued random variable. That is, kurtosis is a descriptor of the shape of a probability distribution. If the peak is not within tolerance, the peak is considered invalid in step 366. If so, in step 376 a peak sharpness measurement is computed. If it is determined in step 378 that the peak sharpness is within tolerance, in step 380 then in step 380 a valid acoustic event has been identified. It is understood that valid refers to a peak generated by an event type for which detection is desired.

In another aspect of the invention, a gunshot detection application is provided for a mobile device, such as a cell phone. With this arrangement, cell phone users proximate a gunshot can detect the gunshot. The cell phones can generate alerts that can be transmitted to a particular address, which can be associated with law enforcement, security company, or other entity. In other embodiments, the cell phones can be networked and collaborate in detecting and/or locating a gunshot.

Figure 4:
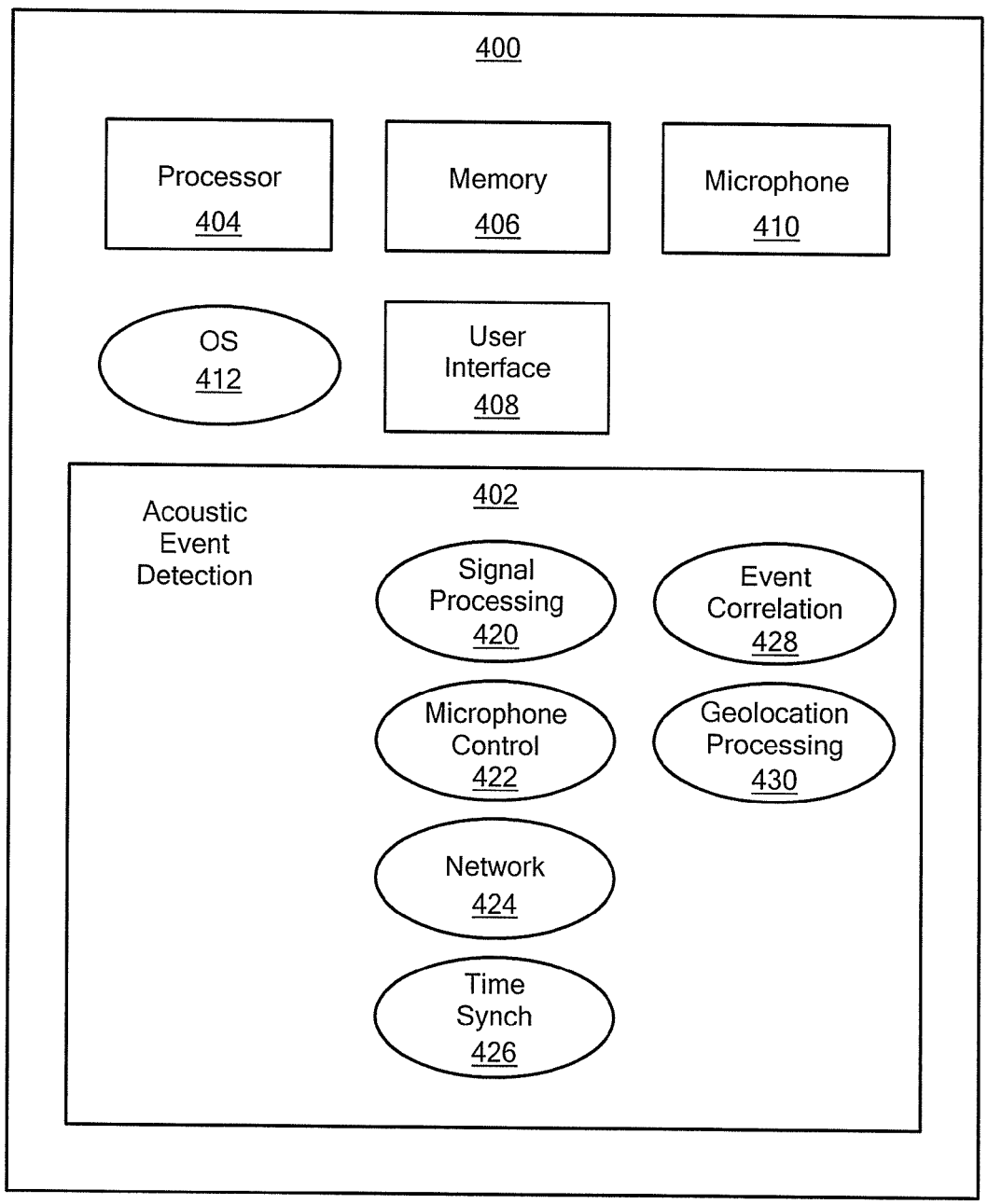
FIG. 4 is a block diagram of a mobile device having an acoustic event detection module.

FIG. 4 shows an exemplary block diagram of a mobile device 400 having an acoustic event detection module 402 in accordance with exemplary embodiments of the invention. In one embodiment, the mobile device 400 includes a processor 404, memory 406, user interface 408, and microphone 410 running on an operating system 412 in a manner well known in the art.

In an exemplary embodiment, the acoustic event detection module 402 includes a signal processing module 420 to receive audio information from the microphone and perform MFCC processing, as described above. A microphone control module 422 can control the microphone to optimize receiving sound for MFCC processing. A network module 424 can establish ad hoc connections to other nearby mobile devices. Establishing ad hoc networks is well known in the art.

A time synchronization module 426 performs time synchronization with a known time to allow events detected by the mobile device to be time stamped in a standardized manner. In one embodiment, GPS signals can be used for time synchronization. In another embodiment, the Precision Time Protocol (PTP) defined by IEEE 1588-2002 and IEEE 1588-2008 is used, which can provide sub-microsecond precision. In general, devices establish an ad hoc network and elect a master clock. The master device providing the master clock broadcasts time on UDP (user datagram protocol) to enable other devices to synchronize to the master clock. With this arrangement, the ad hoc network has a consistent time.

In another embodiment, a time synchronization event (TSE), such as a modulated tone, is used. Devices in the network detect the TSE and define time in terms of the event. Where devices are co-located, sound latency can be ignored. Where devices are spread out, the location of the TSE event should be known to remote devices, which can then calculate distance to the TSE and use TDOA to account for the distance.

An event correlation module 428 uses the time stamp information to correlate events detected by other mobile devices. A geolocation processing module 430 determines the location of an event detected by at least three devices.

It is understood that any practical type of mobile device can be suited to provide gunshot detection. Exemplary device types include cell phone, laptop computers, compact computers, and the like.

Figure 5:
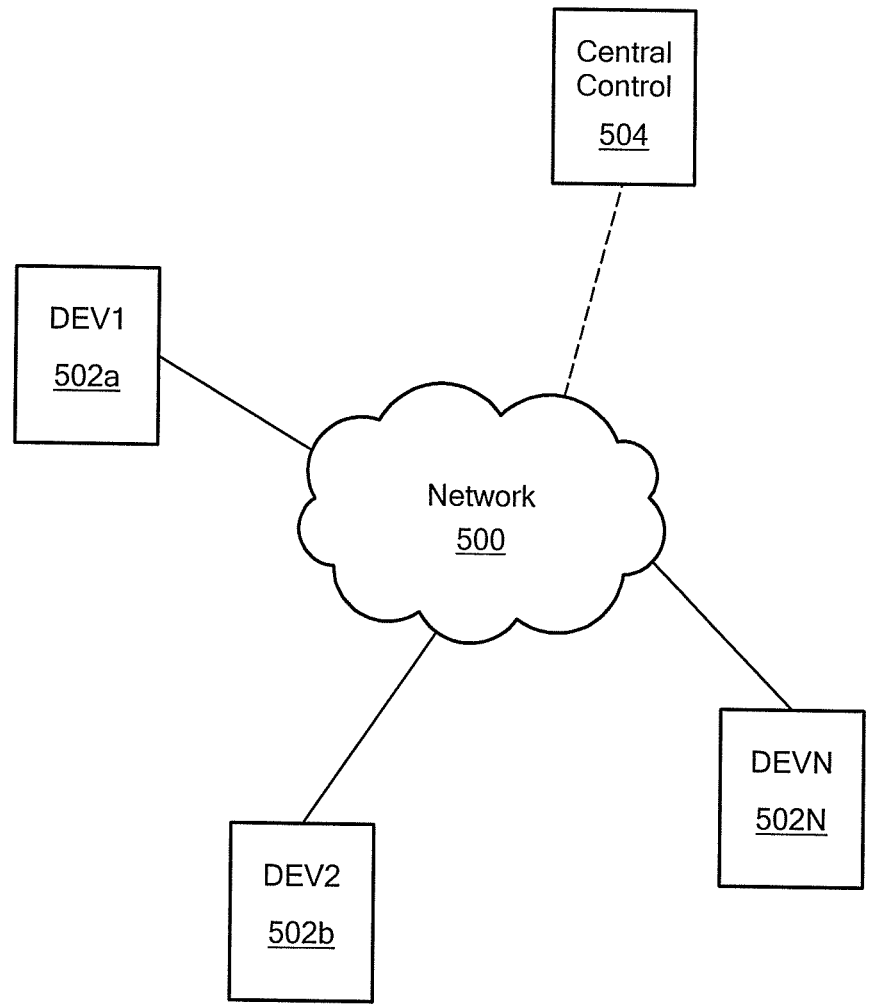
FIG. 5 is a schematic representation of networked mobile devices having acoustic event detection.

FIG. 5 shows an exemplary network 500 to which a plurality of mobile devices 502*a*-N are connected. In one embodiment, the mobile devices 502 form ad-hoc networks in a manner well known in the art. Once the network is formed, event correlation and geolocation processing can be dynamically assigned to devices 502 in the network.

In an alternative embodiment, a central control module 504 can also be connected to the network to perform event correlation and geolocation processing based upon the information provided by the mobile devices 502.

While the term mobile devices is used herein, it is understood that the term mobile device does not require movement of the device. For example, a mobile device, as used herein, can be secured in a particular location, such as a street light. Mobile device refers to a computing device that is smaller than a conventional desktop computer.

Figure 6:
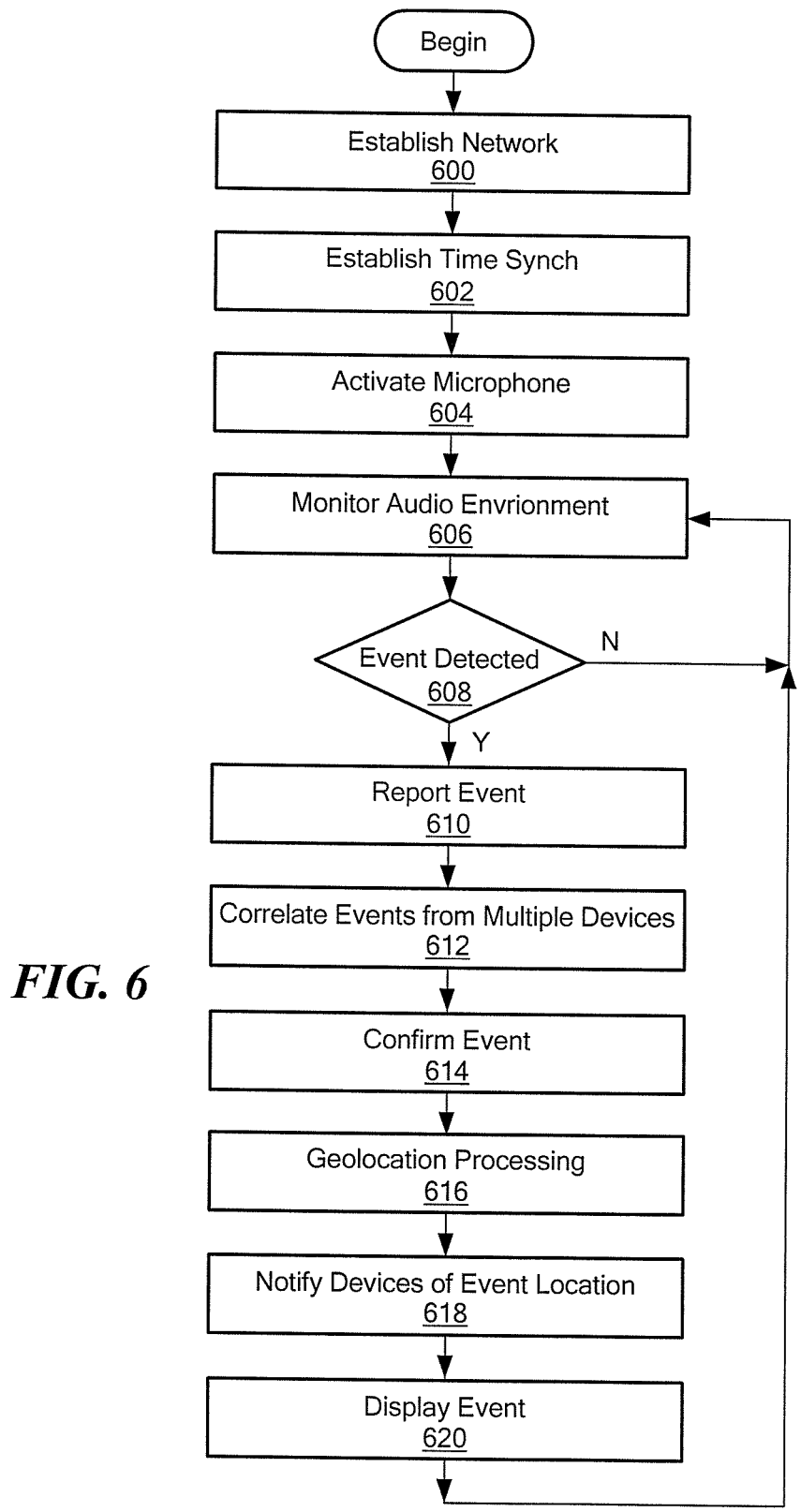
FIG. 6 is a flow diagram showing an exemplary sequence of steps for processing an acoustic event detected by networked mobile devices.

FIG. 6 shows acoustic event detection and location in accordance with exemplary embodiments of the invention. Two devices detecting an event can be used to determine a distance to the acoustic event. Three devices detecting an event can be used to locate the event.

A mobile device, such as mobile device 400 in FIG. 4, establishes a connection to a network along with other devices in step 600. A time sync is established with the network in step 602 to enable time stamping of events that is consistent device-to-device. By time-stamping events in a time-correlated manner, TDOA information can be used for geolocating the source of acoustic events. In general, it is preferred that events be time synchronized to within about 10 ms. In step 604, a microphone suited for detection of an acoustic event of interest can be activated. In one embodiment, an acoustic event module on the mobile device 402, can control network establishment, time synch, microphone activation etc., of the devices.

In step 606, the networked mobile devices 402 monitor an environment for acoustic events. When an event is detected in step 608, the mobile device reports the event to the networked devices in step 610. Exemplary event information includes time of arrival, device location, and event signature. The network, e.g., one or more of the networked devices 402, correlates events from multiple devices and/or sensors in step 612. In step 614, the event is confirmed based on the received acoustic event information and correlation. Once the event is confirmed, in step 616, the event can be geolocated using TDOA information from the various devices that detected the event.

In optional step 618, mobile devices 402, law enforcement, security, etc, can be notified that a gunshot has been detected at a particular location. In one embodiment, mobile devices in the ad hoc network that did not detect the gunshot can be notified that a gunshot was detected in the area. In one embodiment, an alert notification can include a geographical location in latitude/longitude, cross street location, and the like. In optional step 620, a display on a mobile device can display acoustic event information.

Figure 7:
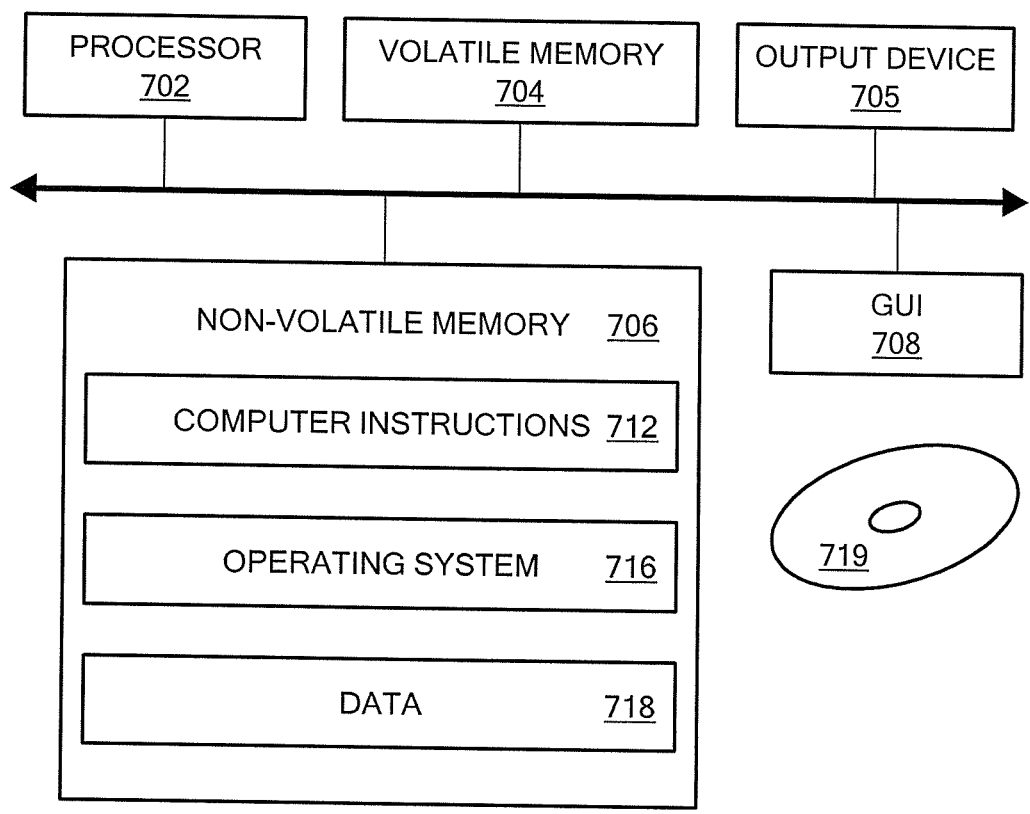
FIG. 7 is a schematic representation of an exemplary computer that can form part of acoustic event detection in accordance with exemplary embodiments of the invention.

Referring to FIG. 7, a computer includes a processor 702, a volatile memory 704, an output device 705, a non-volatile memory 706 (e.g., hard disk), and a graphical user interface (GUI) 708 (e.g., a mouse, a keyboard, a display, for example). The non-volatile memory 706 stores computer instructions 712, an operating system 716 and data 718, for example. In one example, the computer instructions 712 are executed by the processor 702 out of volatile memory 704 to perform all or part of the processing described above. An article 719 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method to identify a type of acoustic event, comprising:
   receiving sound;
   using the received sound to generate Mel Frequency Cepstral Coefficients (MFCCs);
   processing, using a computer processor, the received sound using the MFCCs to locate a peak;
   comparing the peak to a stored event to determine if the peak corresponds to the acoustic event; and
   generating an indication that the acoustic event has been detected.

2. The method according to claim 1, wherein the acoustic event comprises a gunshot.

3. The method according to claim 1, further including controlling a microphone based on the amplitude of an expected type of acoustic event.

4. The method according to claim 1, further including performing geolocation processing for the acoustic event.

5. The method according to claim 1, wherein the step comparing the peak to a stored event is performed by a mobile device, which received the sound.

6. The method according to claim 1, further including establishing an ad hoc network with other mobile devices to correlate and geolocate the acoustic event.

7. An article, comprising:
   a non-transitory computer readable medium having stored instructions that enable a machine to identify a type of acoustic event by:
   using received sound to generate Mel Frequency Cepstral Coefficients (MFCCs);
   processing the received sound using the MFCCs locate a peak;
   comparing the peak to a stored event to determine if the peak corresponds to the acoustic event; and
   generating an indication that the acoustic event has been detected.

8. The article according to claim 7, wherein the acoustic event comprises a gunshot.

9. The article according to claim 7, further including instructions for controlling a microphone based on the amplitude of an expected type of acoustic event.

10. The article according to claim 7, further including instructions for performing geolocation processing for the acoustic event.

11. The article according to claim 7, wherein the step comparing the peak to a stored event is performed by a mobile device, which received the sound.

12. The article according to claim 7, further including instructions for establishing an ad hoc network with other mobile devices to correlate and geolocate the acoustic event.

13. A system, comprising:
   a means for generating Mel Frequency Cepstral Coefficients (MFCCs) from received sound
   a processing means including a computer processor to process the received sound using the MFCCs locate a peak;
   a comparison means to compare the peak to a stored event to determine if the peak corresponds to the acoustic event; and
   generator means to generate an indication that the acoustic event has been detected.

14. A system to identify a type of acoustic event, comprising:
   a memory and a processor configured to:
   generate Mel Frequency Cepstral Coefficients (MFCCs) from received sound;
   locate a peak in the received sound using the MFCCs;
   compare the peak to a stored event to determine if the peak corresponds to the acoustic event; and
   generate an indication that the acoustic event has been detected.

* * * * *